United States Patent
Kula et al.

(10) Patent No.: US 7,361,299 B2
(45) Date of Patent: Apr. 22, 2008

(54) HYDROGEN CLOSED-CYCLE HARDENING UNIT

(75) Inventors: Piotr Kula, Lódź (PL); Stanislaw Filipek, Plochocin (PL); Józef Olejnik, Świebodzin (PL)

(73) Assignees: Instytut Inzynierii Materialowej Politechniki Lodzkiej, Lodz (PL); Seco/Warwick SP. Z O.O., Swiebodzin (PL)

( * ) Notice: Subject to any disclaimer, the term of this patent is extended or adjusted under 35 U.S.C. 154(b) by 58 days.

(21) Appl. No.: 11/281,510

(22) Filed: Nov. 18, 2005

(65) Prior Publication Data

US 2006/0131794 A1    Jun. 22, 2006

(30) Foreign Application Priority Data

Nov. 19, 2004   (PL) .................................... 371276

(51) Int. Cl.
*C21D 1/74*   (2006.01)

(52) U.S. Cl. ........................ 266/252; 266/250

(58) Field of Classification Search ................ 266/250, 266/252
See application file for complete search history.

(56) References Cited

U.S. PATENT DOCUMENTS

| 4,225,320 | A |   | 9/1980  | Gell |
| 4,829,772 | A |   | 5/1989  | Bogdanovi et al. |
| 4,867,808 | A |   | 9/1989  | Heilmann et al. |
| 4,869,470 | A |   | 9/1989  | Heilmann et al. |
| 5,362,031 | A | * | 11/1994 | Heilmann et al. .......... 266/252 |
| 5,630,322 | A |   | 5/1997  | Heilmann et al. |
| 6,722,154 | B1|   | 4/2004  | Tan et al. |
| 2002/0025461 | A1 | | 2/2002  | Shimada et al. |

FOREIGN PATENT DOCUMENTS

DE    102 51 486 A1    5/2004
EP    1 211 329 A2     6/2002

* cited by examiner

*Primary Examiner*—Scott Kastler
(74) *Attorney, Agent, or Firm*—Oliff & Berridge, PLC

(57) ABSTRACT

A hydrogen closed-cycle hardening unit is disclosed that consisting of a vacuum oven with an internal quenching and circulation system, adjusted to operate under a pressure of 2 MPa, fitted with conduits and valves for feeding and discharging of quenching atmosphere. The oven, fitted with a hydrogen and/or nitrogen inlet line and an operating gas outlet line, is connected to two conduits, between the conduits' valves, and, through these conduits, to a unit of two containers. The first container, which is connected to an external hydrogen source, contains a metal alloy absorbing hydrogen as a high-pressure hydride, while second container contains a metal alloy absorbing hydrogen as a low-pressure hydride. Both containers are connected by another conduit.

1 Claim, 1 Drawing Sheet

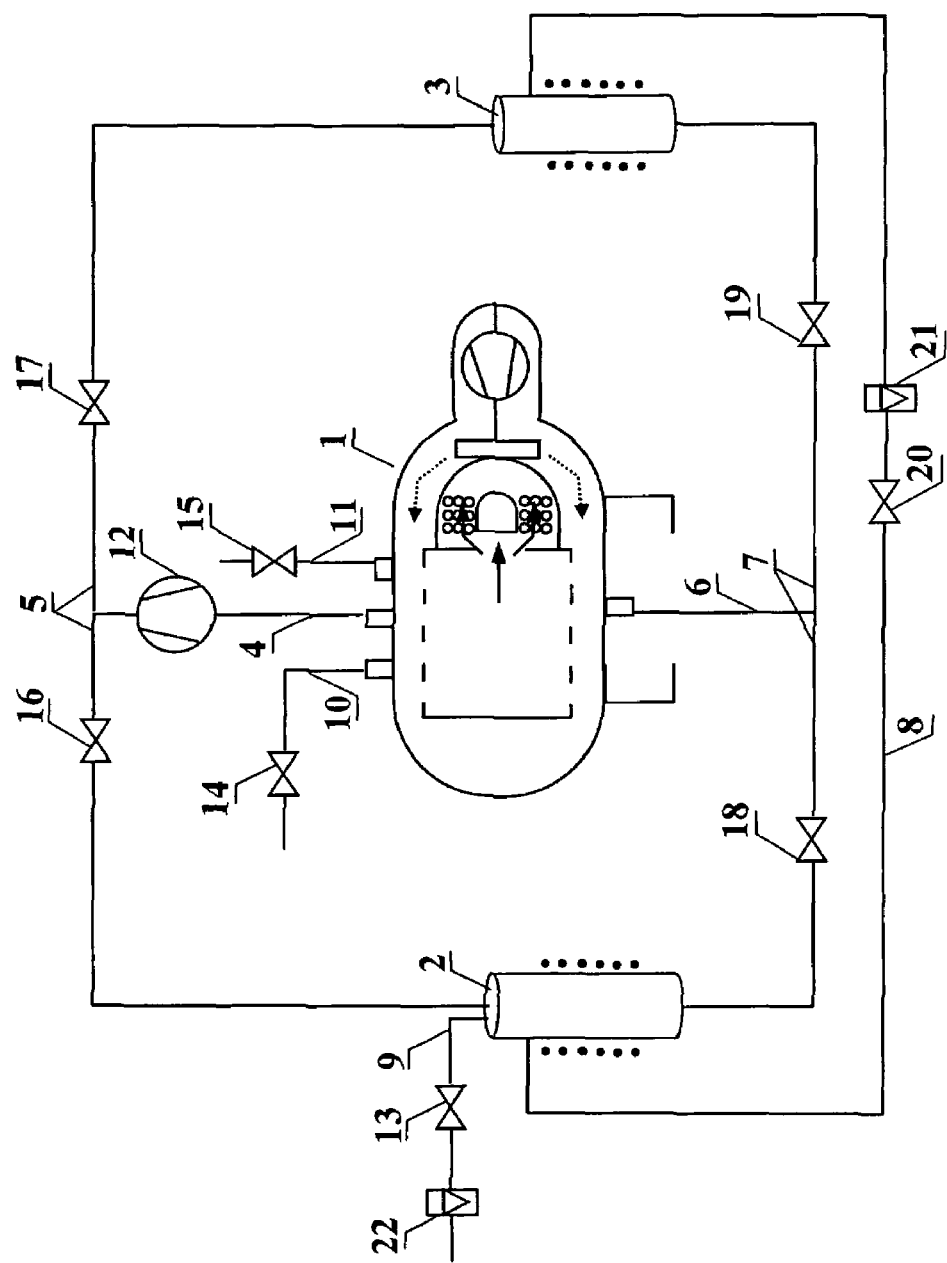

HYDROGEN CLOSED-CYCLE HARDENING UNIT

CROSS-REFERENCE TO RELATED APPLICATION

This Application claims benefit of Polish Patent Application No. 371276 filed Nov. 19, 2004. The entire disclosure of the prior application is hereby incorporated by reference herein in its entirety.

BACKGROUND

The present invention relates to a hardening unit with a hydrogen closed-cycle, designed for hardening elements of machines, mechanical devices and vehicles, under a pressure of hydrogen or hydrogen-containing mixture being higher than the atmospheric pressure.

From the U.S. patent specifications numbered: U.S. Pat. Nos. 4,867,808, 4,869,470, 5,630,322, there are known constructions of vacuum ovens, in which the quenching of a charge is carried out under a gas pressure higher than that of atmospheric pressure, with a continuous circulation and cooling of the quenching atmosphere consisting mostly of nitrogen, helium, hydrogen or a mixture of these gases. From the patent applications numbered: EP 1 211 329 and DE 102 51 486, there are known processes and systems for gas recycling in thermo-chemical treatments with the use of multi-stage systems of mechanical rotary and membrane pumps.

There are also known methods of accumulation and storage of hydrogen in combined forms as metal hydrides as well as accumulators for cyclic accumulation and release of hydrogen, while these hydrides are utilized mostly in motoring sector as fuels in combustion engines and fuel cells.

There are also known, from the U.S. patent specifications numbered: U.S. Pat. Nos. 4,225,320, 4,829,772 and 6,722,154, the systems of a hydrogen closed-cycle between two hydrides with different temperature-pressure equilibrium constants that utilize the heat of formation or hydride dissociation in the technical systems of gas heating, cooling and drying.

From the U.S. patent application No. US 2002/0025461, there is known also a unit for metal hydride charge regeneration, utilizing two metal-hydrides with different temperature-pressure equilibrium constants.

SUMMARY

Disclosed herein is a hydrogen closed-cycle hardening unit consisting of a vacuum oven having an internal quenching and circulation system that is adjusted to operate under a pressure of 2 MPa, the internal quenching and circulation system being fitted with conduits and valves for feeding and discharging of a quenching atmosphere; wherein: the oven is fitted with a hydrogen inlet line or a nitrogen inlet line and an operating gas outlet line; and wherein: (a) the oven is connected on one side to an inlet pipe, (i) the inlet pipe has a low-capacity fan; (ii) the inlet pipe is connected to a first conduit between two valves in the first conduit; and (iii) the first conduit is connected to a unit including a first container and a second container such that the first conduit is connected to the first container beyond one of the two valves in the first conduit and the first conduit is connected to the second container beyond the other of the two valves in the first conduit; (b) the oven is connected, on an opposite side from the connection to the inlet pipe, to an outlet pipe; (i) the outlet pipe is connected to a second conduit between two valves in the second conduit; and (ii) the second conduit is connected to the unit including the first container and the second container such that the second conduit is connected to the first container beyond one of the two valves in the second conduit and the second conduit is connected to the second container beyond the other of the two valves in the second conduit; (c) the first container is connected to a third conduit that contains a valve and a flow meter, the third conduit connecting to an external hydrogen source; (i) the first container is equipped with a first independent heating and cooling system; (ii) the first container contains a metal alloy that absorbs hydrogen as a high-pressure hydride, for which an equilibrium pressure of a reversible formation/dissociation reaction is about 0.01 to about 15 MPa at a temperature in a range of about 298 to about 533° K.; (d) the second container contains a metal alloy that absorbs hydrogen as a low-pressure hydride, for which an equilibrium pressure of a reversible formation/dissociation reaction is about $10^{-6}$ to about 2 MPa at a temperature in a range of 293 to about 673° K.; and (i) the second container is equipped with a second independent heating and cooling system; and (e) the first container and the second container are connected by a fourth conduit that contains a valve and a gas flow meter.

BRIEF DESCRIPTION OF THE DRAWINGS

The FIGURE represents a schematic drawing of an exemplary unit according to the invention.

DETAILED DESCRIPTION OF EMBODIMENTS

The hydrogen close-cycle hardening unit, being composed of an oven adjusted to operate under a pressure up to 2 MPa, equipped with an internal quenching and circulation system and conduits with inlet and outlet valves for the quenching medium, according to the present invention consists in that the said oven has a conduit for feeding nitrogen and a conduit for discharging operating gases, being connected by means of conduits coming out from the oven through two independent conduits to two containers with metal alloys that absorb hydrogen in the form of metal hydrides. One of the conduits, coming out from the oven is equipped with a low-capacity fan. Each of the conduits connecting those coming out from the oven to the containers containing metal alloys that absorb hydrogen in the form of metal hydrides, has two valves each situated on each side of the conduits coming out from the oven. One of the containers, connected with a conduits equipped with a flow meter, valve and pressure gauge to an external hydrogen source, contains an alloy of metals that absorbs hydrogen in the form of a high-pressure metal hydride, for which the equilibrium pressure of the reversible formation/dissociation reaction ranges from 0.01 to 15 MPa at a temperature of 298-533° K.

The other container contains an alloy of metals that absorbs hydrogen in the form of a low-pressure metal hydride, for which the equilibrium pressure of the reversible formation/dissociation reaction ranges from $10^{-6}$ to 2 MPa. Each of the containers with the metal alloys absorbing hydrogen in the form of metal hydrides is equipped with an independent heating-quenching system, while both containers are connected to each other with a conduit fitted with a valve and gas flow meter.

To the container with previously heated metal alloy absorbing hydrogen in the form of high-pressure metal hydride, hydrogen is fed through the conduit with an open valve from an external source until a pressure of 15 MPa at most, then after closing the hydrogen inlet valve, the heating of the container is continued. Next, to the vacuum oven, after filling it with a charge and preparing it to the hardening process, from the container with the high-pressure metal hydride, through the open valve on one of the conduits connecting the container to one of the conduits coming out from the oven, with all the remaining valves being closed, hydrogen is supplied, while the temperature of the container with the high-pressure metal hydride is maintained to reach proper hardening conditions in the oven, and then hydrogen supply is cut off. During hardening, the container with the metal alloy absorbing hydrogen in the form of the high-pressure metal hydride is quenched so as, after the termination of hardening and after opening both valves on the conduits connecting the conduits coming out from the oven, to start a secondary absorption of hydrogen by the metal alloy in the container, previously supplying the oven. The absorption is carried out until the pressure in the oven is lowered to the equilibrium pressure of the reversible formation/dissociation reaction for the high-pressure metal hydride, and then the valves, on the conduits from the side of the container with metal alloy absorbing hydrogen in the form of the high-pressure hydride, are closed. Next, with the open valves on the conduits connecting those coming out from the oven to the container with the metal alloy absorbing hydrogen in the form of the low-pressure metal hydride, there is initiated the absorption of hydrogen still remaining in the oven. Once the oven pressure lowering is ceased, the valves on the conduits connecting those coming out from the oven to the containers with metal alloys absorbing hydrogen are closed, and by supplying nitrogen, the oven is filled up to the atmospheric pressure and discharged. After a possible heating of the container with the low-pressure metal hydride up to the temperature that causes hydrogen to release from the alloy and simultaneous quenching the container with the metal alloy absorbing hydrogen in the form of the high-pressure to the temperature that allows further hydrogen absorption, the valve on the conduit connecting both containers is opened to pass hydrogen until the flow meter shows that there is now further hydrogen discharge from the container with the low-pressure hydride, and then the valve on the conduit connecting both containers is closed. Before introducing hydrogen to the oven in the next hardening cycle, after previous heating the container with the metal alloy absorbing hydrogen in the form of the high-pressure hydride and after checking the pressure inside the container, the loss of hydrogen is filled up from the external source.

The measurements of hydrogen losses in the hardening process carried out in the closed-cycle hydrogen unit according to the invention have shown that the use of conjugated systems of metallic low-pressure and high-pressure hydrides, with the temperature range of the equilibrium pressure of the reversible formation/dissociation reaction of the low-pressure hydride being wider for each hydride systems than that of the high-pressure metal hydride, makes it possible to reduce the hydrogen losses to 5% at most of the total hydrogen quantity used in the process. At the same time, the use of the closed-cycle hydrogen unit eliminates the hazard of explosion or firing during the oven discharge. Moreover, the use of the system of mutually conjugated low-pressure and high-pressure metallic hydrides makes it fully possible to safely store hydrogen in a combined condition for any long period of time between subsequent hardening processes.

Specific examples will now be described in detail. These examples are intended to be illustrative, and the invention is not limited to the materials, conditions, or process parameters set forth in these embodiments. All parts and percentages are by weight unless otherwise indicated.

EXAMPLES

The subject of the invention is presented in the below given examples illustrated with a schematic drawing of the unit. The denotations used in the examples are chemical symbols of elements: H-hydrogen, La-lanthanum, Ni-nickel, Sn-tin, Mg-magnesium, Al-aluminum; Mm denotes mischmetal with a weight composition of 58% of lanthanum, 28.6% of cerium, 5.8% of praseodymium and 7.5% of neodymium.

Example I

Vacuum oven 1, equipped with an internal gas quenching and circulation system, was filled with a low-alloy steel charge and heated under vacuum up to the austenitization temperature and held at this temperature for 30 min. At the same time, first container 2 containing $LaNi_{4.8}Sn_{0.2}$ alloy absorbing hydrogen in the form of high-pressure metal hydride, was heated to a temperature of 333° K. and the valve 13 on the conduit 9 to a pressure vessel with compressed hydrogen was opened to pass this gas until the gas flow was ceased as shown by the flow meter 22, then after closing the valve 13, the temperature of first container 2 was raised to 533° K. to generate a pressure of 10.4 MPa. Next, the valve 16 was opened on the conduit 5 connecting first container 2 to the oven 1 through the inlet pipe 4 fitted with the low-capacity fan 12, starting the filling of the oven 1 with hydrogen until a pressure of 1 MPa was reached, continuing at the same time the heating of first container 2 to maintain required temperature of the alloy, from which hydrogen is desorbed, then the valve 16 was closed and the hardening process was started, quenching at the same time first container 2 to a temperature of 318° K. Once the hardening process was terminated, the valve 16 on the conduit 5 was opened again and so was the valve 18 on the conduit 7 connecting first container 2 through the outlet pipe 6 to the oven 1, starting the secondary absorption of hydrogen by $LaNi_{4.8}Sn_{0.2}$, and maintaining proper temperature. When the pressure in the oven 1 was lowered below 0.15 MPa, the valves 16 and 18 were closed and the valves 17 and 19 on the conduits 5 and 7 to second container 3 were opened. The temperature of $Mg_2Ni$ alloy in second container 3 was 293° K. At this temperature the absorption of hydrogen by the alloy in second container 3 was carried out until the pressure inside the oven 1 dropped below 0.01 MPa, then the valves 17 and 19 on the conduits 5 and 7 were closed. The pressure inside the oven 1 was increased up to the atmospheric pressure by feeding nitrogen through the hydrogen and/or nitrogen inlet line 10 and the charge was unloaded. In order to continue the absorption of hydrogen by $LiNi_{4.8}Sn_{0.2}H_x$ in first container 2, $Mg_2NiH_x$ alloy in second container 3 was heated and held at a temperature of 673° K., while $LaNi_{4.8}Sn_{0.2}H_x$ alloy in first container 2 was quenched and held at 313° K. Next, the valve 20 on the conduit 8, connecting both containers 2 and 3, was opened, monitoring the flow of hydrogen with the gas flow meter 21. Once the hydrogen flow between containers 2 and 3 was ceased, the valve 20 was closed, while the temperature in first container 2 was raised up to 333° K. and the loss of hydrogen was filled up to the amount required in the subsequent hardening cycle. The measurement of the hydrogen loss showed 0.3% of the total hydrogen amount used in the previous hardening cycle.

Example II

Following the procedure as in example I, MmNi$_4$Sn$_{0.3}$ alloy in second container 3 was heated to a temperature of 328° K. and saturated with hydrogen and then it was heated to 473° K. to reach a pressure of 10.9 MPa. Under this pressure the valve 16 on the conduit 5 was opened in order to fill the oven 1 with hydrogen to reach a pressure of 1.6 MPa and then the hydrogen flow to the oven 1 was cut off. Once the hardening process was terminated, the valve 16 on the conduit 5 and the valve 18 on the conduit 7 were opened to start the secondary absorption of hydrogen by the alloy in first container 2, previously quenched and held at a temperature of 313° K. The secondary absorption was carried out until the pressure inside the oven 1 was lowered below 0.25 MPa and then the valves 16 and 18 were closed and the valves 17 and 19 on the conduits 5 and 7 to second container 3 were opened; LaNi$_4$Al alloy in second container 3 was previously heated to a temperature of 313° K. The hydrogen absorption by LaNi$_4$Al alloy in second container 3 at 313° K. was carried out until the pressure inside the oven 1 was decreased to 0.01 MPa and then after closing the valves 17 and 19, continuing the procedure as in example I, the charge was unloaded. In order to start the desorption of hydrogen from LaNi$_4$AlH$_x$ alloy and to send it to MmNi$_4$AlH$_x$ alloy in first container 2, second container 3 was heated to a temperature of 573° K., while first container 2 was quenched to a temperature of 298° K. and under these conditions the valve 20 on the conduit 8 was opened. When the gas flow meter 21 indicated that the hydrogen flow between the containers 2 and 3 was ceased, the valve 20 was closed, while the temperature inside first container 2 was raised to 328° K. and the hydrogen loss was filled up to the quantity required in the subsequent hardening cycle. The measurement of the hydrogen loss showed 0.17% of the total amount of hydrogen used in the hardening process.

Example III

Following the procedure as in example I, first container 2 with MmNi$_4$Sn$_{0.3}$ from example II was heated to a temperature of 453° K. to generate a pressure of 8.2 MPa, and while maintaining this temperature the oven 1 was filled with hydrogen to reach a pressure of 0.7 MPa. Then, the hydrogen inflow was closed and the quenching atmosphere in the oven 1 was made up with nitrogen through the hydrogen and/or nitrogen inlet line 10 with open the valve 14 to the total pressure 1 MPa. Once the hardening process was terminated, in quenched container 2 held at 313° K., as in example I, the secondary absorption of hydrogen was started and continued with running the fan 12 until the pressure in the oven 1 was decreased to 0.55 MPa. Then, after closing the valves 16 and 18 on the conduits 5 and 7, and opening the valves 17 and 19, with the fan 12 still running, the absorption of hydrogen by LaNi$_4$Al in second container 3, previously heated and held at 313° K., was started and continued until the pressure on the oven 1 was decreased to 0.32 MPa. Then, the valves 17 and 19 were closed, the fan 12 was switched off, and excess gas above atmospheric pressure was removed by opening the valve 15 on the operating gas outlet line 11 that discharges the quenching atmosphere from the oven 1. Continuing the procedure as in example II, hydrogen was sent from first container 2 to second container 3, in which, following the procedure as in example I, the hydrogen loss was filled up and found to be below 5% of the total quantity of hydrogen used in the hardening process.

It will be appreciated that various of the above-discussed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A hydrogen closed-cycle hardening unit comprising a vacuum oven having an internal quenching and circulation system that is adjusted to operate under a pressure of about 2 MPa, the internal quenching and circulation system being fitted with conduits and valves for feeding and discharging of a quenching atmosphere; wherein:
   the oven is fitted with a hydrogen inlet line or a nitrogen inlet line and an operating gas outlet line; and wherein:
   (a) the oven is connected on one side to an inlet pipe,
      (i) the inlet pipe has a low-capacity fan;
      (ii) the inlet pipe is connected to a first conduit between two valves in the first conduit; and
      (iii) the first conduit is connected to a unit including a first container and a second container such that the first conduit is connected to the first container beyond one of the two valves in the first conduit and the first conduit is connected to the second container beyond the other of the two valves in the first conduit;
   (b) the oven is connected, on an opposite side from the connection to the inlet pipe, to an outlet pipe;
      (i) the outlet pipe is connected to a second conduit between two valves in the second conduit; and
      (ii) the second conduit is connected to the unit including the first container and the second container such that the second conduit is connected to the first container beyond one of the two valves in the second conduit and the second conduit is connected to the second container beyond the other of the two valves in the second conduit;
   (c) the first container is connected to a third conduit that contains a valve and a flow meter, the third conduit connecting to an external hydrogen source;
      (i) the first container is equipped with a first independent heating and cooling system; and
      (ii) the first container contains a metal alloy that absorbs hydrogen as a high-pressure hydride, for which an equilibrium pressure of a reversible formation/dissociation reaction is about 0.01 to about 15 MPa at a temperature in a range of about 298 to about 533° K.;
   (d) the second container contains a metal alloy that absorbs hydrogen as a low-pressure hydride, for which an equilibrium pressure of a reversible formation/dissociation reaction is about $10^{-6}$ to about 2 MPa at a temperature in a range of 293 to about 673° K.; and
      (i) the second container is equipped with a second independent heating and cooling system; and
   (e) the first container and the second container are connected by a fourth conduit that contains a valve and a gas flow meter.

* * * * *